April 21, 1931.   A. C. PETERSON   1,801,366
AUTOMOTIVE SPEED CONTROLLING MEANS
Filed May 28, 1925    2 Sheets-Sheet 2

Inventor
Adolphe C. Peterson.
By Adolph Peterson.
Attorney

Patented Apr. 21, 1931

1,801,366

UNITED STATES PATENT OFFICE

ADOLPHE C. PETERSON, OF MINNEAPOLIS, MINNESOTA

AUTOMOTIVE SPEED-CONTROLLING MEANS

Application filed May 28, 1925. Serial No. 33,573.

My invention relates to automotive speed controlling means wherefore it is called an automotive speed controlling means.

The principal objects of my invention are to provide a means whereby an automotive vehicle such as an automobile may be automatically controlled to accommodate the power generation to the requirements of various conditions so that any speed such as desired by an operator and such as he may set the means for is automatically maintained until such time as the operator may desire a change in the speed to be maintained, to thereby enable an operator to maintain a better average speed, to thereby enable an operator to maintain any predetermined speed such as he may determine is suitable for any condition of traffic without further throttle control on his part, to thereby enable an operator to set the driving means so that he may know without constant inspection that a speed not in excess of a certain speed such as a traffic speed regulation speed may be automatically maintained, to enable the use of a device such that if desired the power driving means may be locked to operate the vehicle at a speed not in excess of a certain maximum, to provide in connection therewith efficient automatic acceleration means whereby the operator's mind is freed from the thought of acceleration regulation and whereby his hands or feet are freed from the necessity of acceleration control, to provide in connection means whereby a carbureting means is automatically fixed to deliver the mixture most suitable for light or idle running, for normal running, for maximum power and acceleration, to provide carburetor means which is readily and easily controlled to provide the correct mixture for light, normal and maximum power running, to provide novel carburetor regulation means so that the proper mixtures for various conditions of operation are secured, and in general to provide carbureting and speed controlling means which shall have the advantages enumerated in a simple, economically constructed device, and in general also to provide in connection with speed denoting or measuring means a novel speed controlling means and carburetor controlling means.

The principal devices and combinations of devices constituting my invention are as hereinafter described and defined in the claims. In the accompanying drawings which illustrate my invention like characters refer to like parts throughout the several drawings.

Referring to the drawings.

Figure 1:
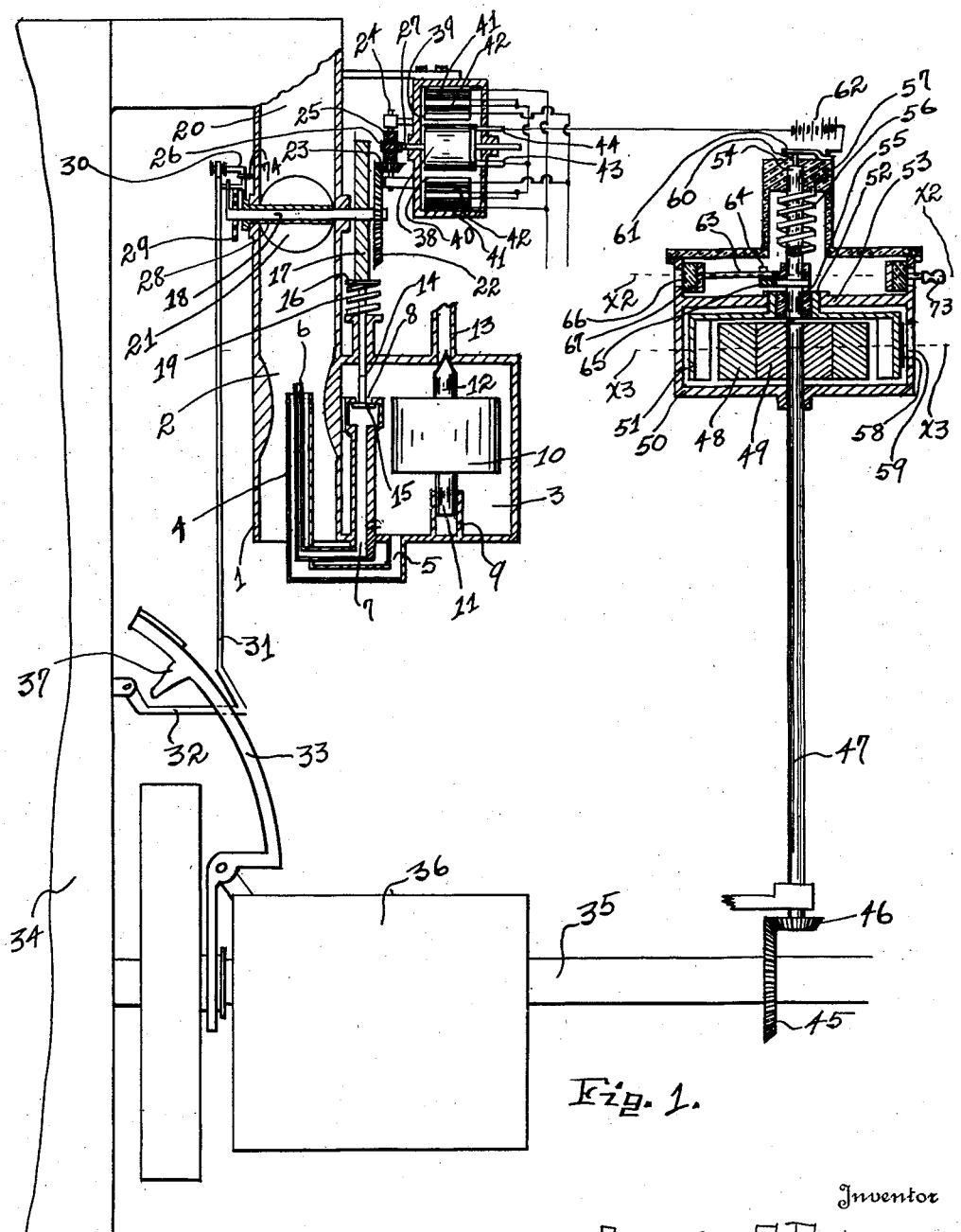
Figure 1 is a view in vertical section on the line X1X1 of Figures 2 and 3, through a carburetor and speed measuring means embodying my invention, this view showing also diagrammatically and broken away an engine, clutch, transmission and propeller shaft such as is used commonly in automotive vehicles.

Referring again to the drawings, the numeral 1 indicates the body of a carburetor, cast or otherwise constructed, embodying a Venturi tube 2, a float chamber 3, a main or normal nozzle 4 connected by passage 5 with the float chamber 3, a secondary or enriching nozzle 6 which is concentric and centrally disposed in the main nozzle 4, a passage 7 from the secondary or enriching nozzle to the port 8 within the float chamber 3, and a sleeve 9 providing slidable vertical support for a float 10, the latter being separately constructed and slidable vertically by means of its depending rod 11 in the sleeve 9. The float 10 has a valve 12 which when the float rises closes the outlet from the conduit 13 which connects the float chamber with any source of supply of liquid fuel as gasoline supplied preferably under gravity pressure. The Venturi tube 2 has at its lower end an opening to the atmosphere as shown. The carburetor body has immediately above the port 8 a sleeve wherein a valve rod 14 is vertically slidable, the valve rod 14 bearing at its lower end a conical valve 15 and bearing at its upper end a flat head 16, the latter so broad and smooth that it offers means whereby a cam 17 mounted immediately above it upon a throttle axle 18 may depress the valve rod 14 or permit it to be elevated by a spring 19 acting upward yieldably against the under side of the flat head 16. The throttle axle 18 bears within the tube 20 which ascends from the Venturi tube 2 a butterfly valve 21, the throttle axle being trunnioned to have swinging movement as shown. The throttle axle 18 bears also at its end a mitre gear 22 of relatively large diameter which is adapted to be actuated by and controlled by a relatively small diameter mitre gear 23 which latter is secured to a nearly vertically mounted revolvable rod or axis 24, trunnioned as shown, the axis or rod 24 having at its upper end a worm gear 25 with which cooperates so as to actuate it a worm pinion 26 the latter being secured upon an armature shaft 27.

The throttle or butterfly valve 21 is mounted upon a sleeve 28 the latter being freely rotatable upon the throttle axle 18, but so controlled by a spring 29 that it normally occupies a fixed position, rotationally, relative to the throttle axle 18, but so that it may be moved yieldably so as to close the tube 20 by a lever 30 attached to the sleeve 28 at its end outside the body of the tube 20, the lever 30 having connection by a rod 31 with a lever 32, so that whenever the operator depresses the clutch pedal 33 so as to disconnect the engine 34 from the transmission 36 and thereby from propeller shaft 35 the lever 30 will be pulled so as to close the butterfly valve against the tension of the spring 29, and irrespective of the control which is automatically provided, described hereinafter. The connection with the clutch pedal should be such however that the butterfly valve is freely controlled by the automatic control through the axle 18 whenever the clutch pedal is released so that the clutch is engaged, and to this end the clutch pedal by its depending projection 37 merely moves the lever 32 when the clutch pedal has been quite completely but not entirely depressed.

The armature shaft 27 has upon it an armature 38 which latter revolves between field magnets 39, 40 under excitation, as hereinafter described. The field magnets 39, 40 each have two coils, coils 41, one on each, and coils 42, one on each. The coils 41 are wound in such way as to cause revolution of the armature in one way and the coils 42 are wound in such way as under excitation to cause revolution of the armature in the other direction. The armature has a commutator as diagrammatically shown, upon which brushes 43, 44 contact.

The propeller shaft 35 bears upon it a mitre gear 45, thereby driving a smaller mitre gear 46, the latter driving with it a vertical shaft 47 and at the upper end of the vertical shaft a magnet 48, the latter being in the form of a split ring or somewhat of a horseshoe type and held to the shaft by preferably some non-magnetic metal 49. The magnet 48 is of the usual type used in magnetic speedometers and runs within a housing 50 and between iron pole pieces fixed at diagrammatically opposite positions on the interior sides of an inverted cup 51, the latter preferably of iron but possibly of some non-magnetic material and rotatably mounted to revolve on the same axis, extended, as that of the magnet 48, by means of an upwardly extending collar 52, the latter revolving in the division wall 53 as a bearing. The collar 52 is secured firmly to the lower end of a vertically mounted shaft 54 by means of an insulating bushing 55, the shaft 54 being thereby insulated from the cup 51 but revolvable uniformly with the latter, in the limited degree hereinafter described. The shaft 54 is yieldably held or positioned by a spirally coiled spring 56 acting between it and the upper insulation cover 57 of the housing 50, so that it normally holds a position, called the retarded position, but so that it may whenever the cup 51 is drawn by magnetic attraction of the magnet 48, progressively rotate against the tension of the spring 56 in proportion to the degree of attraction rotatively exerted by the magnet under rotation of the shaft 47, the attraction being proportionate to the speed, and the spring 56 between calibrated so as to measure the speed in this manner as is generally done in magnetic speedometers, it being contemplated that the construction of the magnet and the cup and pole pieces, or the relation between the magnet and the shaft 54 is such that speed of the propeller shaft 35 is thereby measured. The cup 51 bears upon its outer sides numeral figures or figure plates 58 whereby an operator may read the position of the cup and thereby the speed measured as the numerals appear through a window 59 in the housing 50.

Figure 2:
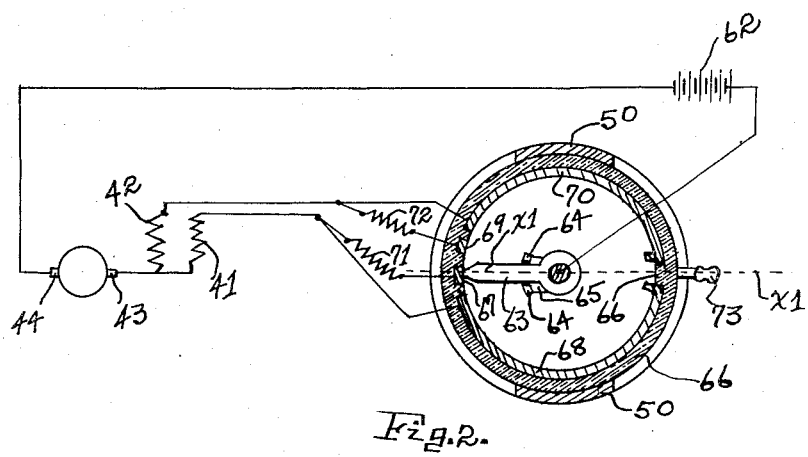
Figure 2 is a view in horizontal cross section on the line X2X2 of Figure 1 through the speed measuring means.
Figures 3, 4:
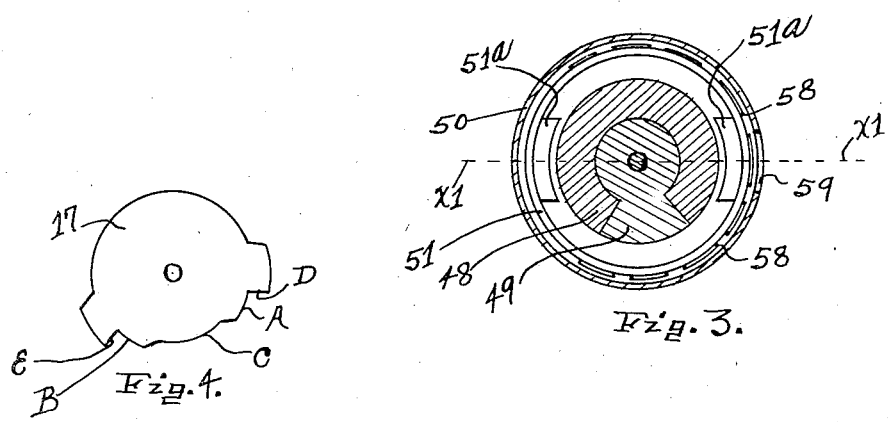
Figure 3 is a view in horizontal cross section on the line X3X3 of Figure 1 through the speed measuring means.
Figure 4 is a side view of the cam controlling the mixture changing means, that is showing the profile of this cam.

The upper end of the shaft 54 has a small upwardly extending projection 60 against which bears a small flat spring 61 the latter forming a connection by means of the wire or conductor as shown with one terminal of a battery 62. The shaft 54 bears upon it a contact brush 63 the latter having very slight and in some cases no movement in a horizontal plane, that is rocking movement relative to the shaft 54, this movement being in no case more however than a degree or so. The contact brush 63 is limited in its slight movement, relative to the shaft 54, by shoulders 64 upon a sector 65 the latter fixed permanently to the shaft 54. The contact brush 63 bears against a circular turnable insulator ring 66 or against metal contacts 67, 68 and 69, 70 formed in the wall of the insulator ring 66 interiorly. The contacts 67, 68 are connected both to one end of the field coils 41, a resistance coil or element 71 being however interposed between the contact 67 and the field coils 41. The other ends of the field coils 41 are each connected to the armature brush 43 as shown. The contacts 69, 70 are connected both to one end of the field coils 42, a resistance coil or element 72 being however interposed between the contact 69 and the field coils 42. The other ends of the field coils 42 are connected to the armature brush 43 as shown in the diagrammatic sketch and illustration of the contacts in Figure 2. The other armature brush 44 is connected as shown to the remaining terminal of the battery.

In the operation of my device, or its use, it is contemplated that the engine, transmission and propeller shaft are used as commonly in automotive vehicles or in any manner, and the propeller shaft being driven and driving the vehicle (not shown) through its axle, the vertical shaft 47 imparts a commensurate speed of revolution to the magnet 48. The magnet 48 thereby exerts its drag upon the cup and the shaft 54 commensurately with the speed and the shaft 54 and with it the contact brush 63 is swung or rotated one or more degrees depending on the speed in one direction, and if the speed at any time decreases is commensurately allowed to retard or fall back by the tension of the spring. As the contact brush 63 is thereby moved into positions determined by the speed of the propeller shaft, the contact brush moves with the speed from the neutral position between the contacts 67, 69, that is against the insulation. The contact brush 63 is always against the neutral position when the speed is that predetermined by the operator by the setting of insulator ring 66 by means of handle 73, but the operator may move or partially revolve the insulator ring to change the neutral position. Whenever the speed is less or decreases from that of the predetermined position, the contact brush 63 will move against the contact 67, thereby forming a connection through a resistance coil with the field coils corresponding to or producing so called reverse direction and opening of the throttle, and if the speed is considerably less or becomes considerably less than the predetermined speed the contact brush 63 moves upon the contact 68 and thereby forms connection directly without interposition of the resistance coil with the same field coils whereby an increased speed of the armature shaft in the same reverse direction, opening the throttle is effected since the current flows from the battery directly, and this opening operation will continue until the speed of the propeller shaft is sufficiently increased so as to maintain the predetermined speed. If however the speed is greater than or becomes greater than the predetermined speed the contact brush 63 will move from the neutral position to the contact 69, or thence to the contact 70, in the first position causing passing of current through resistance to the field coils for forward movement of the armature shaft, and in the second position causing passing of the current to the same coils without interposition of the resistance so that greater speed of the armature shaft in the same direction is secured. Thereby the throttle is closed or opened at any time as necessary to effect maintenance of or procuring of the speed determined by the operator, and he may change this predetermined speed at any time by turning the insulator ring as described. If during these movements of the throttle, the throttle is turned to a position such that it is say only one third or one quarter open, that is for abnormally low loads upon the engine, the face A of the cam 17 will depress 15 so as to open the secondary or enriching nozzle to the flow of fuel from the float chamber, and likewise if the throttle axle is turned in the opposite direction at any time, beyond the full open position of the throttle, the throttle will be held in the full open position by the impinging of the lever 30 against the bar 74, the cam 17 being then further turned so that the face B of the cam depresses the valve 15 so as to permit fuel to flow to the enriching nozzle. This occurs whenever full open position of the throttle does not immediately produce the speed predetermined. In positions of the throttle above the abnormally low load that is above one third or one quarter open, the face C of the cam normally permits the valve 15 to be elevated so as to close communication of the fuel supply with the enriching nozzle. Whenever acceleration is needed therefore the face B causes enriching of the carbureted air passing to the engine, and also whenever light or abnormal loads are encountered the carbureted air is enriched. The shoulders D and E of the cam prevent further turning of the armature shaft and throttle axle than as so limited. If the operator at any time declutches, this action when complete results also in closing the throttle to the engine idling point only. Means may of course be provided for completely closing the throttle when desired.

Any form of motor reversing means may be used instead of that as shown. The worm and worm pinion are, it is contemplated by their form adapted to normally hold the throttle axle in any position until the armature is electrically driven.

While I show particular devices and combinations of devices in the illustration of my invention, I contemplate that other detailed devices and combinations of devices may be used in the realization of my invention without departing from the spirit and contemplation thereof.

The contact brush as shown is merely a simple element that is adapted to make the contacts as shown; but it is to be noted that it would be preferable to employ a yieldably extensible contact means such as is usually or commonly employed in contact making means in distributors so that under all conditions contact will be easily made and surely made. And it is to be noted that any form of speed measuring means may be used with my device, and that in the magnetic form as shown instead of having one cup and pole piece unit performing the regulating function and the speed denoting function, two cups and pole piece units may be employed, one for each function, in order that greater assurance of independence of the speed denoting means may be had, and in particular it is to be noted that the device should be made with such devices as ball bearings and also friction eliminating means in the contact means as rollers, so that the device is as sensitive as necessary, the parts being also so proportioned as to secure the requisite sensitiveness.

What I claim is:

1. In a speed controlling means, a throttle, an electric motor adapted to actuate the throttle to close or open the same through reduction gearing, a speed measuring means, an electric current supply, means whereby the speed measuring means controls the current supply to the motor so as to procure opening or closing of the throttle to maintain a predetermined speed, and means whereby the motor in control positions for acceleration and low speeds actuates an enriching means in a related carburettor to permit passing of enriched carburetted air through the carburettor as controlled by the throttle.

2. In a control means, a driven governor element in operative relation with a propelling means, a speed sensitive element responsive to the speed changes in the driven governor element, a contact carrier having a primary contact actuable proportionately with the speed sensitive element by oscillation on an axis, a supplementary contact carrier oscillable on the same axis by manual locating means for speed determination, a forward drive contact in the supplementary contact carrier and a reverse drive contact in the supplementary contact carrier, means whereby the formed drive contact and the reverse drive contact when included in a motor circuit are effective to drive the motor armature in forward and reverse direction respectively, geared transmission between the motor armature and the throttle in an engine, and a current supply adaptable to be connected in the circuit with the motor by the primary contact and the forward drive contact or reverse drive contact as determined by the speed sensitive element.

In witness whereof I have hereunto set my hand this 24th day of May, 1924.

ADOLPHE C. PETERSON.